(No Model.)
E. KETTERING.
HARNESS PAD.
No. 277,291. Patented May 8, 1883.
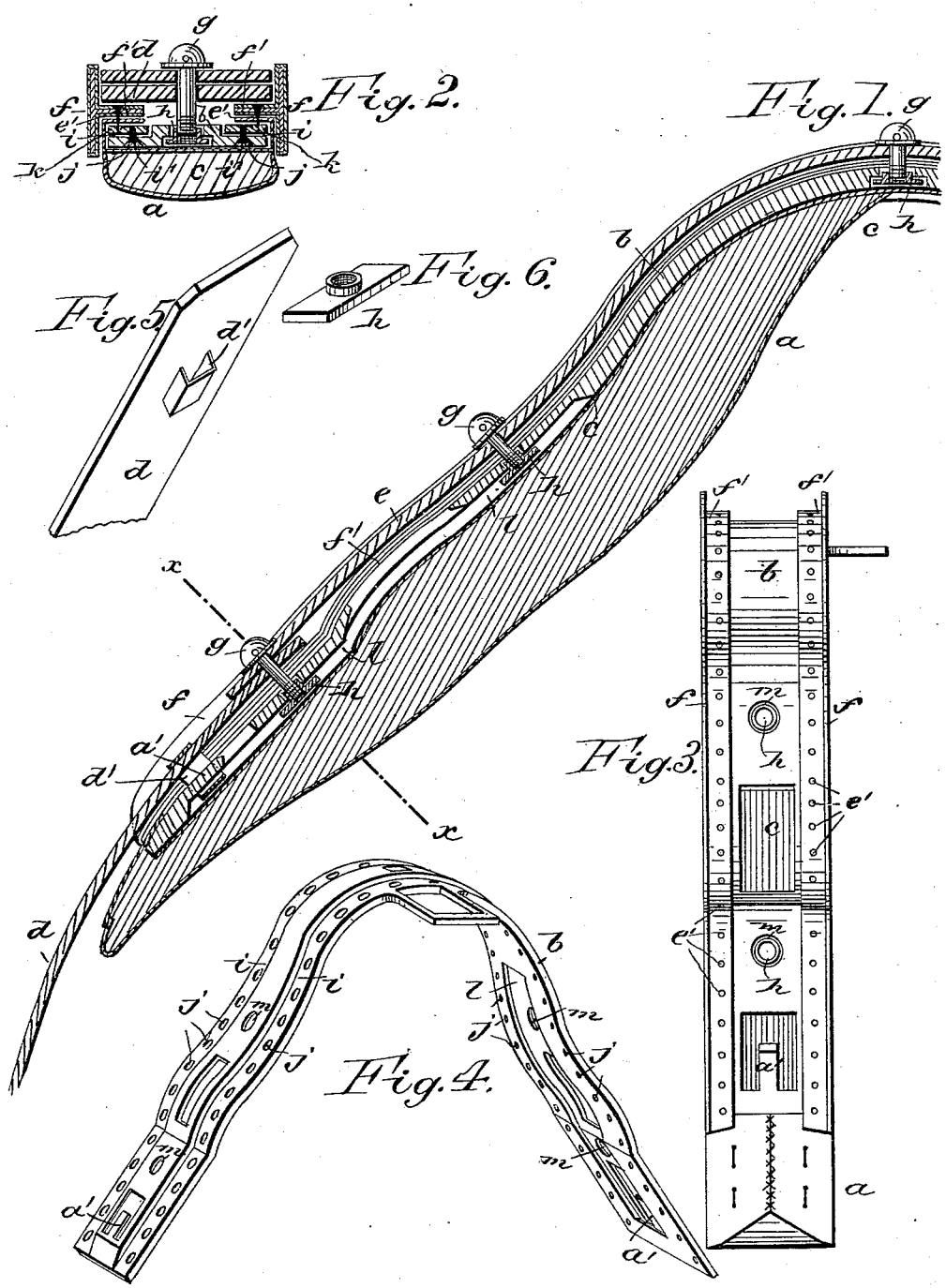
WITNESSES:
Otto Beyer
C. Sedgwick
INVENTOR:
E. Kettering
BY Munn & Co
ATTORNEYS.

UNITED STATES PATENT OFFICE.

EDWARD KETTERING, OF JEFFERSON CITY, MISSOURI.

HARNESS-PAD.

SPECIFICATION forming part of Letters Patent No. 277,291, dated May 8, 1883.

Application filed December 5, 1882. (No model.)

*To all whom it may concern:*

Be it known that I, EDWARD KETTERING, of Jefferson City, in the county of Cole and State of Missouri, have invented certain new and useful Improvements in Harness-Pads, of which the following is a full, clear, and exact description.

Reference is to be had to the accompanying drawings, forming part of this specification, in which similar letters of reference indicate corresponding parts in all the figures.

Figure 1 is a longitudinal sectional elevation of one side of a harness-pad made in accordance with my invention. Fig. 2 is a cross-sectional elevation taken on the line $x\,x$, Fig. 1. Fig. 3 is a side elevation of the pad, the skirt and trimming straps being removed. Fig. 4 is a perspective view of the pad-plate. Fig. 5 is a perspective view of the upper end of the skirt-strap, showing the loop or staple by which it is held to the pad-plate; and Fig. 6 is a perspective view of one of the nuts used for securing the trimming and skirt straps to the pad-plate.

The invention will first be described in connection with the drawings, and then pointed out in the claims.

Referring to the drawings, $a$ represents the main pad-leather; $b$, the metallic pad-plate; $c$, the leather lining of the pad, placed between the inner surface of the pad-plate and the stuffing of the pad.

$d$ represents the skirt-straps, which are provided on the under side with the metallic loops or staples $d'$, for attaching the straps to the hooks or tongues $a'\,a'$, formed on the pad-plate.

$e$ represents the outside facing or trimming straps; $f\,f$, the side flanges of the pad-plate; and $g\,g$ and $h\,h$ represent, respectively, the bolts and nuts for attaching the trimming and skirt straps to and holding them properly down upon the pad-plate $b$. The pad-plate $b$ is depressed at its edges on its outer surface, as shown at $i\,i$, and is perforated near its edges with the rows of small holes $j\,j$, as shown in Figs. 2 and 4.

$k\,k$, Fig. 2, represent narrow strips of leather or similar material placed in the depressions $i\,i$ of the pad-plate $b$. These strips may be stitched in place through the holes $j\,j$, or they may be held by the small nails or rivets $i'\,i'$, driven through the holes $j\,j$ from the inside of the pad-plate through the strips of leather, and clinched on the upper or outside of the straps, as shown in Fig. 2.

The side flanges, $f\,f$, are each made of a core of sheet metal, (tin or zinc,) T-shaped in cross-section, and covered with leather, and these flanges are held in place by the small nails or rivets $e'\,e'$, driven through the inwardly-projecting portions $f'\,f'$ of the flanges, through the edges of the pad-covering $a$, and through the strips $k\,k$, down upon the pad-plate $b$, which causes them to clinch under the said strips $k\,k$, as will be clearly understood from Fig. 2. The under side of the pad-plate $b$ is chambered out or recessed, as shown at $l$, for partially inclosing and holding the nuts $h\,h$ in proper position under the orifices $m\,m$, for receiving the screw-threaded ends of the bolts $g\,g$, which hold the skirt and trimming straps, as shown clearly in Fig. 1.

In forming the pad the strips $k\,k$, of leather or similar material, are first secured upon the pad-plate $b$ by driving and clinching the nails or rivets $i'\,i'$, a few of the holes $j\,j$, through which the nails pass, being left vacant for securing the pad-lining $c$, which is then secured in place by small nails or rivets driven through it, and through the said vacant holes $j$, and through the strips $k$. The nuts $h\,h$ are then put in place, and the pad-leather $a$ is then tacked to the strips $k\,k$, and then stuffed, and the open end closed and finished. The flanges $f\,f$ are then tacked to the strips $k\,k$, over the edges of the pad-leather $a$, by the tacks $e'\,e'$. The skirt-straps $d$ are then hooked upon the tongues $a'\,a'$, and finally the facing or trimming straps $e$ are put in place between the flanges $f\,f$, and held by screwing in the bolts $g\,g$, one of which also passes through the upper end of the skirt-strap $d$, for holding it down and properly in place on the pad-plate.

By this construction it will be seen that the pad can be very quickly, easily, and cheaply made, and that it is very strong and neat, and that the trimming and skirt straps may be removed and new ones supplied without taking the pad apart or in any manner injuring it.

Having thus described my invention, what I claim as new, and desire to secure by Letters Patent, is—

1. The pad-plate $b$, provided with hooks $a'$ at its ends, the perforated depressions $i\,i$ along its edges, and the recesses $l$ in its under side, substantially as herein shown and described.

2. The combination, with the pad-plate $b$, provided with the hooks $a'$, and the flanges $f$, of the skirt-straps $d$, provided with the loops $d'$, and the bolts $g$, substantially as herein shown and described.

3. The pad-plate $b$, having the strips $k\,k$ secured thereto, in combination with the side flanges, $f\,f$, nailed or otherwise secured to the strips, substantially as described.

4. The pad-plate $b$, formed with the series of holes $j\,j$, in combination with the strips $k\,k$, secured to the plate, and the pad-leather $a$, secured to the strips, as set forth.

5. The pad-plate $b$, formed with the depressions $i\,i$, perforations $j\,j$, recesses $l$, tongues $a'$, and orifices $m$, in combination with the pad-leather $a$, lining $c$, strips $k\,k$, skirt-straps $d$, provided with the loop $d'$, trimming-straps $e$, bolts $g$, and nuts $h$, as and for the purposes set forth.

6. The skirt-straps $d$, provided with the loops $d'$, in combination with the pad-plate $b$, formed with the hooks or tongues $a'$, substantially as and for the purposes set forth.

7. The pad-plate $b$, formed with the perforations $j$, and having the strips $k\,k$ secured thereto by the nails or rivets $i'$, in combination with the pad-leather $a$ and side flanges, $f\,f$, secured to the strips by the nails or rivets $e'$, substantially as set forth.

EDWARD KETTERING.

Witnesses:
JOHN H. LYONS,
LOUIS C. KRAUTHOFF.